Dec. 25, 1962     O. F. BAUER ETAL     3,069,813
TESTING OR FINISHING MACHINE FOR BEVEL OR HYPOID GEARS
Filed June 26, 1961     3 Sheets-Sheet 1

INVENTORS
OLIVER F. BAUER
ERNST J. HUNKELER
BY
*Richard W. Treverton*
ATTORNEY 3,069,813
TESTING OR FINISHING MACHINE FOR BEVEL OR HYPOID GEARS
Oliver F. Bauer and Ernst J. Hunkeler, Rochester, N.Y., assignors to The Gleason Works, Rochester, N.Y., a corporation of New York
Filed June 26, 1961, Ser. No. 119,558
22 Claims. (Cl. 51—26)

The present invention relates to a machine for running together pairs of gears, especially bevel or hypoid gears, for testing them or for finishing them by an abrading process, such as lapping, honing or burnishing. The primary objective is a simple and compact mechanism for mechanically effecting the desired relative motions between the gears as they run together.

A machine according to the invention comprises a frame supporting a housing which journals a spindle for one gear, a plate supporting a housing which journals a spindle for the other gear, said plate being supported for movement relative to the frame in a plane parallel to both spindles, a pair of levers pivoted about axes perpendicular to said plane and providing a connection between the frame and the plate for guiding the latter for angular and translational motions relative to the frame in said plane, and means for effecting said motions.

In the preferred embodiment of the invention shown in the accompanying drawings.

Figure 3:
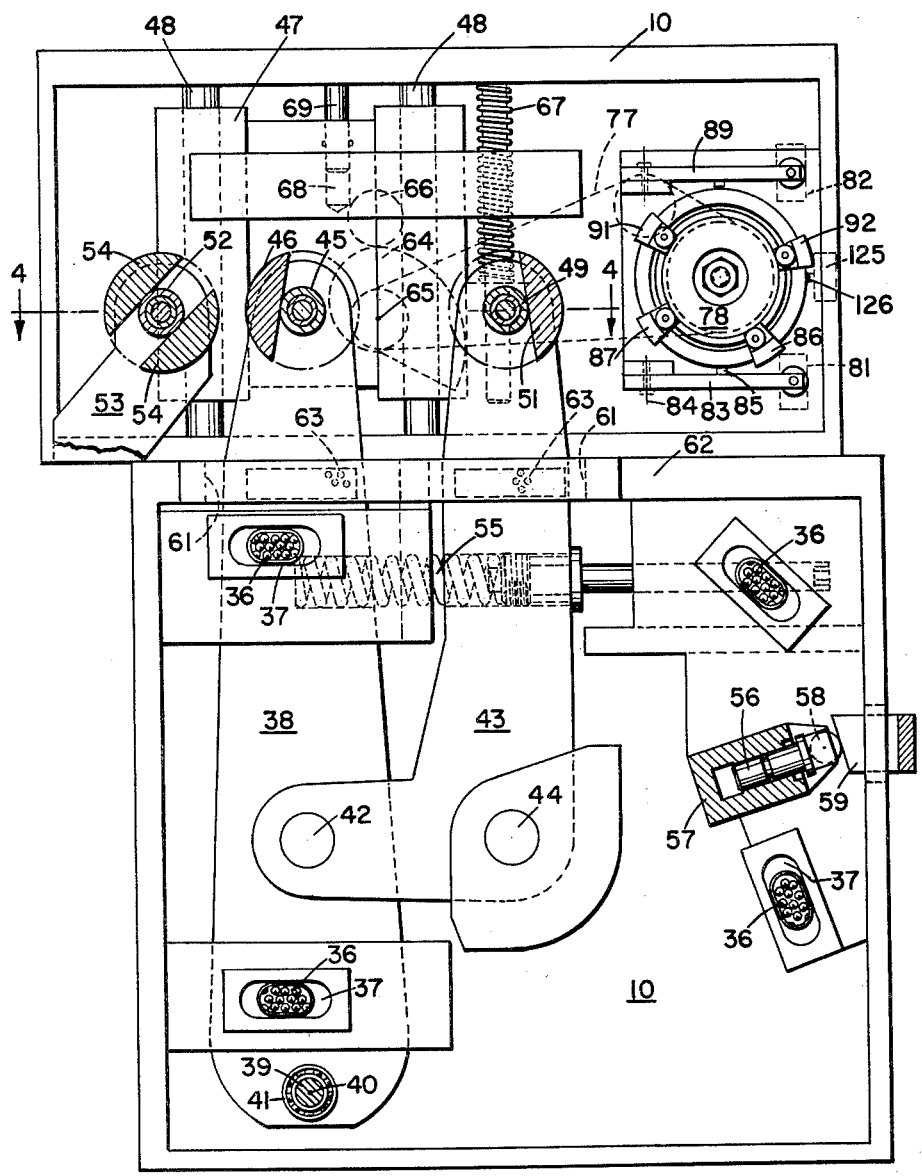
FIG. 3 is a plan view of a portion of the machine, approximately in plane 3—3 of FIG. 2, with the parts thereabove removed.
Figure 5:
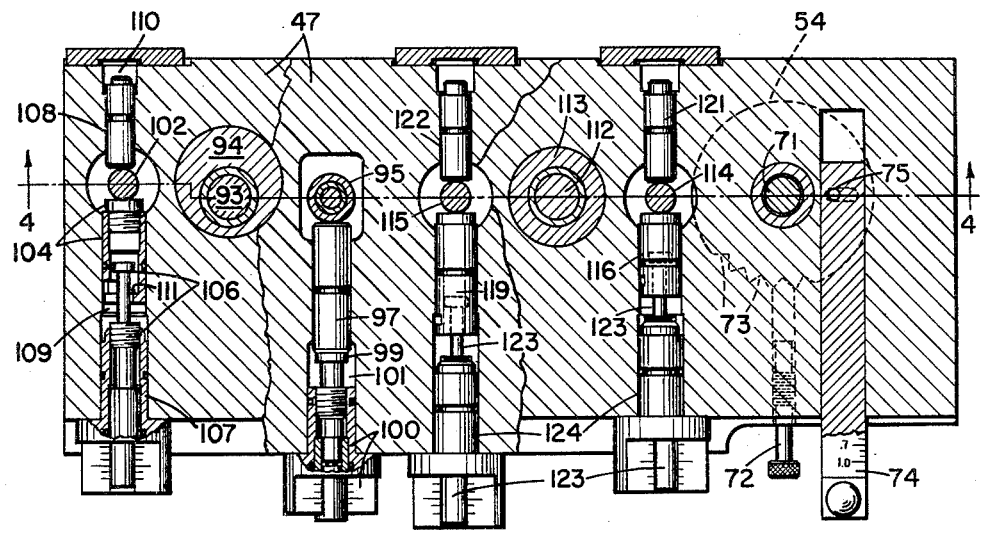
Figure 4:
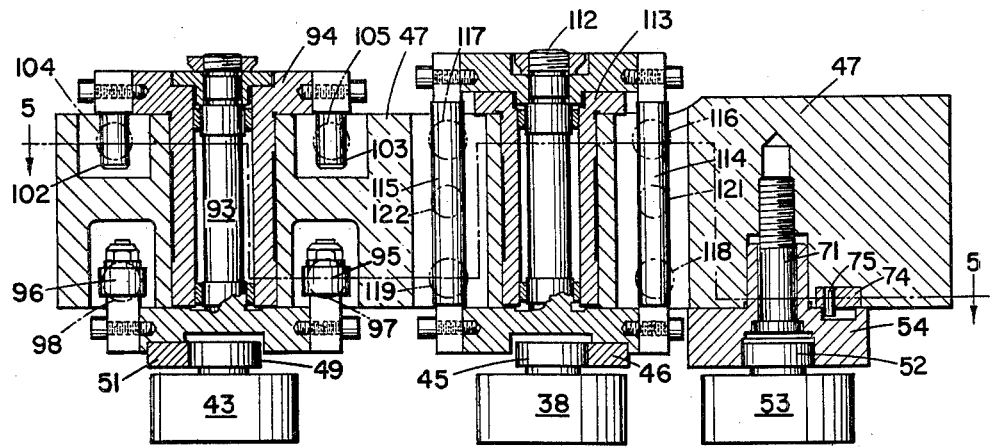

FIG. 4 is a vertical sectional view, approximately in planes 4—4 of FIGS. 3 and 5; and, FIG. 5 is a horizontal sectional view in the planes designated 5—5 in FIG. 4.

The machine is similar in general arrangement, and in the relative motions which it imparts to the gears, to that disclosed in Patent No. 2,947,120, granted August 2, 1960 to O. F. Bauer and E. Stark. It comprises a frame 10 on which is mounted a gear spindle housing or head 11 journaling a spindle 12 for rotation about horizontal axis 13, the spindle being provided with a suitable chuck or arbor 14 for holding a bevel or hypoid gear G. The frame also supports a pinion spindle housing or head 15 which journals a spindle 16 for rotation about horizontal axis 17, this spindle having a chuck 18 for a pinion P that is to be run in mesh with gear G.

The gear head 11 is adjustable vertically along guide rods 19 on a supporting column 21 by means of an adjusting screw 22 having a graduated dial 23. This adjustment adapts the machine for gears having different amounts of hypoid offset, i.e. different vertical spacings of axes 13 and 17. The column 21 is adjustable horizontally, in a direction parallel to pinion axis 17, along guide rods 24 mounted on the frame. Such adjustment, which adapts the machine for gears G of different diameters, is effected by means of an adjusting screw 25 to which a graduated dial 26 is affixed.

Figure 1:
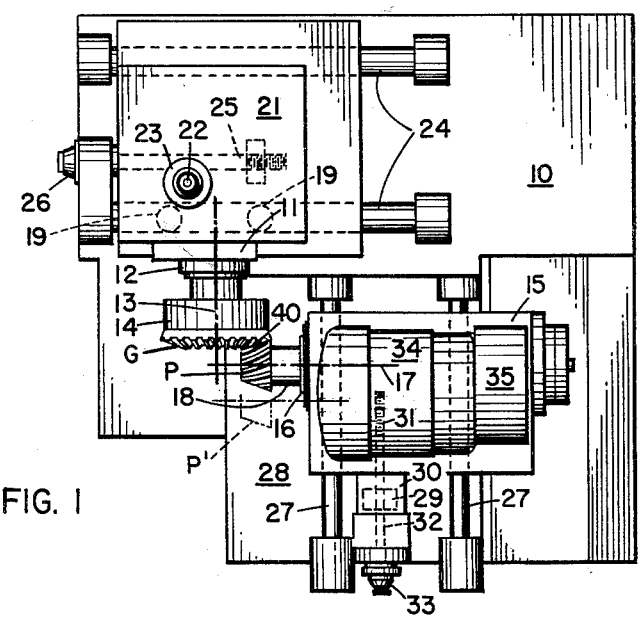
FIGS. 1 and 2 are respectively a plan and a front view of the machine, the latter having parts broken away and appearing in section.

The pinion head 15 is supported by horizontal guide rods 27 for motion therealong in a direction perpendicular to pinion axis 17, and parallel to gear axis 13. Rods 27 are mounted on a plate 28, and movement of the head along them, to carry the pinion P between running position shown in full lines in FIG. 1, and loading position shown in broken lines at P', is effected by a suitable means represented in the drawings as comprising a piston 29 operating in a cylinder 30 on the plate. The piston is connected to the head 15 by a screw 31 which is rotatable in the piston, by means of a manually rotatable shaft 32 splined to the screw, to adjust the head along the rods 27. Such adjustment adapts the machine for pinions P of any diameter within its capacity range. To facilitate the adjustment a calibrated dial 33 is affixed to shaft 32.

The pinion spindle 16 is driven by reversible electric motor 34 which is mounted on the head 15, being connected to the motor by an endless belt drive, not shown, enclosed by guard 35. A drive load is placed on the gears G and P by means of a brake, not shown, which is arranged to resist rotation of the gear spindle 12.

The present invention is concerned particularly with means for moving plate 28 in a horizontal plane for the purpose of slightly changing the relative positions of the gear and pinion to thereby shift the tooth bearing or contact area along the teeth, in the general manner explained in aforementioned Patent No. 2,947,120. The motions comprise (a) an oscillation about a vertical axis 40 which in the illustrated embodiment passes through the mesh zone of gears, this oscillation having as its primary effect the shifting of the tooth bearing lengthwise of the teeth, (b) a reciprocation in the direction of the pinion axis 17, in time with the oscillation, for the primary purpose of maintaining the tooth bearing in the desired relation to the addendum and dedendum margins of the tooth sides, and (c) a reciprocation in the direction of the gear axis 13, for the primary purpose of maintaining the desired amount of backlash between the gears as oscillation (a) and reciprocation (b) proceed.

The plate 28 is supported for these motions by having bottom plane horizontal faces, not shown, seating on ball bearings 36, FIG. 3, which are arranged to roll on plane horizontal surfaces 37 on the frame 10. These ball bearings are encircled by oval retainer rings which have limited free movement with the ball bearings in any horizontal direction. The plate 28 is pivoted on axis 40 to a lever 38, the pivot comprising a pin 39 which is secured to the lever and is journaled in the plate in an anti-friction bearing 41. Lever 38 is pivoted by a pin 42 to a bell-crank lever 43 pivoted to the frame 10 by pin 44. The end of lever 38 opposite to pin 39 carries an anti-friction roller 45, FIGS. 3 and 4, for following a plane-faced cam shoe 46. The latter is carried by a slide 47 which is movable along horizontal guide rods 48 on the frame. A roller 49 on lever 43 is arranged to follow a cam shoe 51, also carried by slide 47. Another roller 52 is carried by an arm 53 which is rigid with plate 28 and is arranged to follow another cam shoe 54 carried by slide 47. Rollers 45 and 49 are held in contact with cams 46 and 51 by a spring 55, FIG. 3, which acts in compression between levers 38 and 43. A plunger 56 operating in a cylinder 57 on the frame 10 has a roller 58 bearing against a lug 59 which depends from plate 28. Pressure applied to the plunger, from the hydraulic pressure system of the machine, urges the lug, and the plate, clockwise about pivot axis 40 and thus maintains roller 52 against the right (in FIG. 3)

cam face of cam 54. Levers 38 and 43 extend through slots 61 in a wall 62 of the frame, and, to supplement their support by pivots 42 and 44, are arranged to roll on ball bearings 63 disposed between them and the upper and lower walls of the slots, their bearing support arrangement being similar to that shown at 36, 37.

Figure 2:
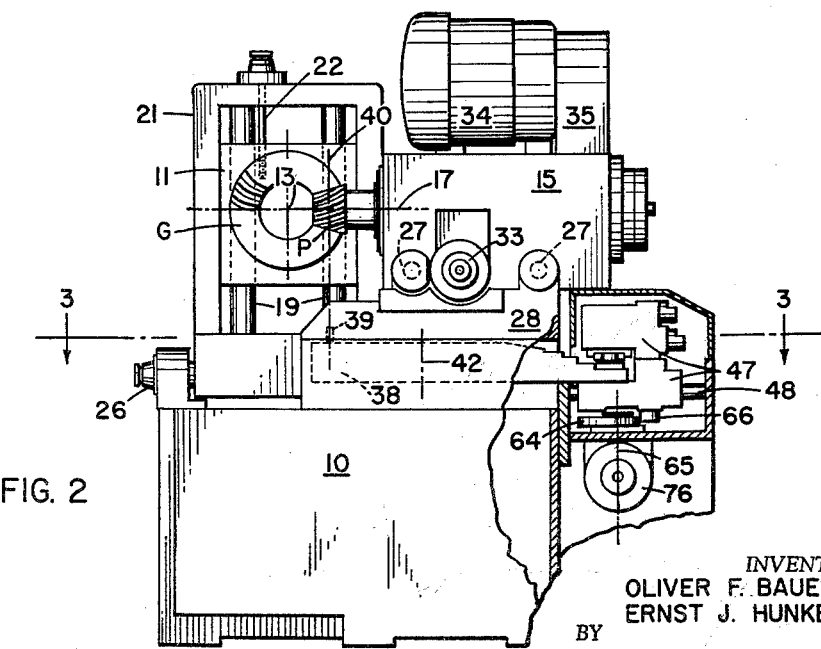

Slide 47 is reciprocated on guide rods 48 by a cam 64, FIGS. 2 and 3, which is oscillated relative to the frame about a vertical axis 65 by a reversing motor drive, the cam acting against a roller 66 carried by the slide. The roller is held against the cam by a spring 67, FIG. 3, acting in compression between frame 10 and the slide, and by hydraulic pressure applied to cylinder 68 in the slide, the pressure reaction being against a plunger 69 slidable in the cylinder and secured to the frame.

The stroke of the slide reciprocation by cam 64, and the positions of cam shoes 46, 51 and 54 on the slide, are adjustable as subsequently will be described. With the cam shoes adjusted to the positions shown in FIG. 3, inward motion of the slide (downward in FIG. 3) will result in (a) cam 54 acting on roller 52 to swing the plate 28 clockwise about pivot axis 40; (b) cam 51 acting on roller 49 to swing the lever 43 counterclockwise about pivot 44 and thereby move lever 38 and plate 28 in a direction (downwardly in FIG. 3) to displace the pinion P along its axis 17 to the left in FIGS. 1 and 2; and (c) cam 46 acting on roller 45 to swing the lever 38 clockwise (in FIG. 3) about pivot 42, moving pivot axis 40 and plate 28 in the direction of the gear axis 13 (to the left in FIG. 3) to move the pinion P toward the gear G. Outward motion of slide 47 along rods 48 will of course effect motions (a), (b) and (c) in the opposite directions.

The magnitude and direction of motion (a), i.e. oscillation about axis 40, for a given stroke of slide 47, may be adjusted by rotating the cam shoe 54 about a stud 71, FIGS. 4 and 5, which connects it to the slide, to thereby vary the inclination of the cam face of the shoe. A set screw 72 engageable in any one of several notches 73 in the periphery of the shoe holds the latter in adjusted position. A rod 74 movable longitudinally in slide 47 carries a pin 75 which is engaged in a radial slot in the shoe. Upon loosening of screw 72 the rod may be moved manually to cause the pin to rotate the shoe to the desired position of adjustment. To facilitate such adjustment, graduations are provided on rod 74. Finer adjustment of motion (a) is made by varying the amplitude of oscillation of cam 64. This oscillation is effected by a reversible motor and reduction gear unit 76 which through a sprocket and endless chain drive 77, FIG. 3, also oscillates plates 78 of a reversing means for the motor. This reversing means includes two switches, 81 and 82, the first of which is arranged to reverse motor 76 when the main motor 34 is running forwardly, so that the drive is on one side of the teeth of gears G and P, and the second of which is arranged to reverse motor 76 when the main motor is running reversely and the drive is therefore on the other side of the gear teeth. Switch 81 is operated by a lever 83, pivoted on axis 84, and having a roller 85 which is alternately engageable by stops 86 and 87 on plate 78. Engagement of stop 86 with the roller actuates the switch to effect a reversal of motor 76 when the cam and the plate, rotating clockwise in FIG. 3, reach a desired limit position, while engagement of the roller by stop 87 actuates the switch to effect another motor reversal when the cam and the plate reach the desired limits of their counterclockwise rotation. Stops 86 and 87 are independently adjustable angularly around the plate 78 so that the limit positions may be varied as desired. Switch 82 is similarly actuated by means including a lever 89 and independently adjustable stops 91 and 92. By suitable adjustable counters, not shown, associated with the motor control circuits of the machine, a selected number of oscillations of cam 64 may be made to occur while the motor 34 is operating forwardly, and then the same or another selected number of oscillations may occur while the motor 34 is operating reversely.

The means for adjusting the cam shoes 51 and 46 on the slide 47 are shown in FIGS. 4 and 5. Shoe 51 has a stem 93 journaled for rotation in a sleeve 94, the latter being rotatable in the slide 47 about an axis eccentric of stem 93. Anti-friction rollers 95 and 96 are carried by shoe 51 on diametrically opposite sides of stem 93, and are respectively adapted for abutment by pistons 97 and 98 which are reciprocable in parallel bores in the slide 47. Piston 98 is not shown in FIG. 5, but its form and the adjustable stop means for it are identical with those of piston 97. These stop means include a stop screw 99 threaded to a sleeve 100 secured to the slide, the screw serving to limit outward motion of the piston, i.e. downward motion in FIG. 5. By application of hydraulic pressure through chamber 101 against piston 97, while pressure on piston 98 is released, piston 97 is moved inwardly, swinging the cam shoe 51 and its stem 93 counterclockwise, in FIGS. 3 and 5, to a limit position determined by the adjustment of the stop screw 99 of piston 98. By reversed application of pressure, i.e. application of pressure to piston 98 while that to piston 97 is released, the shoe may be swung clockwise, to the limit determined by the stop screw 99 for piston 97. As shown, each sleeve 100 bears graduations to facilitate adjustment of the related stop screw. Reversal of the hydraulic pressures applied to pistons 97 and 98 is effected by a suitable solenoid valve, not shown, operated by the reversing switch for motor 34, so that the cam shoe 51 may have one selected angular position while the gears P and G are being driven forwardly, and a different selected angular position while they are being driven reversely.

The cam shoe 51 may also be shifted translationally, i.e. to the right or left in FIGS. 3, 4 and 5, concomitantly with reversal of the drive of the gears, by angular motion of eccentric sleeve 94. Due to the relation of the parts this is without appreciable effect upon the angular motion adjustments effected by stop screw 99. For effecting the translation, pins 102 and 103 secured to the sleeve 94 on diametrically opposite sides thereof are arranged for abutment respectively with pistons 104 and 105 which operate in parallel bores in the slide. Only piston 104 is shown in FIG. 5. Each piston has associated therewith a stop screw 106 that is screw threaded into a sleeve 107 similar to sleeves 100. Stop screws 106 however are arranged to limit the inward motions of pistons 104 and 105, as contrasted with the limitation of outward motion of pistons 97 and 98 by stop screws 99. This difference necessitates the provision of an auxiliary piston 108 of smaller diameter to act against each pin, 102 or 103, in opposition to the related piston 104 or 105, for holding the pin to the piston. Upon application of pressure through chambers 109 and 110 to piston 104 and related piston 108, and release of pressure against piston 105 (and the pin 108 related to it), the pin 102 is moved to turn the eccentric sleeve 94 clockwise, in FIG. 5, until flange 111 of piston 104 abuts the head of its stop screw 106. Similarly, upon reverse application of pressure, i.e. application of pressure to piston 105, and the related auxiliary piston 108, the pin 103 and sleeve 94 are swung counterclockwise by a selected amount. The resulting translational adjustment of cam shoe 51 in effect enables the gears G and P to be positioned differently relative to each other in the direction of pinion axis 17 during forward drive by motor 34 than during reverse drive. The reversal of pressure to pistons 104 and 105, and their related auxiliary pistons, is effected by the same valve which reverses the pressures to pistons 97 and 98.

Inasmuch as the pivoting of pinion P relative to gear G about axis 40 in either direction from a mean position tends to reduce backlash between them, while motion of the pinion along its axis 17 either increases or decreases the backlash depending upon the direction of the motion, it is desirable to provide for four different positions of cam shoe 46—one for clockwise and one for counterclockwise displacements about axis 40 during forward drive of the gears, and one for clockwise and one for counterclockwise displacements during reverse drive. Hence four sets of pistons and stop screws generally similar to those shown at 104, 105 and 106 are arranged to control cam shoe 46. The latter has a stem 112 which is journaled for rotation in a sleeve 113 fixed to the slide 47, and secured on diametrically opposite sides of the stem are pins 114 and 115. These pins are adapted for abutment by upper pistons 116 and 117, respectively, and by lower pistons 118 and 119, respectively. Pistons 121 and 122 of smaller area, similar in function to pistons 108, respectively engage pins 114 and 115 in opposing relation to the pistons 116—119. Pressure is applied to piston 121 whenever it is applied to either piston 116 or 118, and to piston 122 whenever it is applied to either of pistons 117 and 119. Pistons 116—119 are essentially of the same form as pistons 104, 105 and their inward limit positions are individually adjustable by screws 123, of the same general form as screws 106. Screws 123 are threaded into graduated sleeves 124, which are similar to sleeves 100 and 107. By means of the aforementioned valve which alternately applies pressure to pistons 97 and 98, pressure is applied to one or the other of pistons 116 and 117 when motor 34 is running forwardly, and is applied to one or the other of pistons 118 and 119 when the motor is running in the reverse direction. During forward operation pressure is applied by another solenoid operated valve to piston 116 when the cam 64 is angularly displaced in one direction from its center position, i.e. when the pivoting motion of pinion P about axis 40 is to one side of its starting position, and is applied to piston 118 when the cam is displaced in the opposite direction from its center position. Similarly during reverse operation of gears G and P the last-mention solenoid valve alternately applies pressure to pistons 117 and 119. The reversal of this valve is effected by a reversing switch 125, FIG. 3, which is actuated by a stop button 126 fixed on plate 78 each time the cam 64 passes through its mean or starting position, this being the position in which the axes of the cam follower rollers 45, 49, 52 are aligned with the axes of angular adjustment of the respective cams 46, 51, 54.

Having now described the preferred embodiment of our invention, what we claim is:

1. A machine for running a pair of gears together comprising a frame supporting a housing which journals a spindle for one gear, a plate supporting a housing which journals a spindle for the other gear, said plate being supported for movement relative to the frame in a plane parallel to both spindles, a pair of levers pivoted about axes perpendicular to said plane and providing a connection between the frame and the plate for guiding the latter for angular and translational motions relative to the frame in said plane, means for oscillating said levers for effecting said translational motion, and means for oscillating the plate to effect said angular motion.

2. A machine according to claim 1 in which said levers and the means for oscillating them are arranged to effect two component translational motions of the plate in said plane which are approximately at right angles to each other.

3. A machine according to claim 2 in which said levers comprise first and second levers pivoted to each other and respectively pivoted to the frame and to said plate.

4. A machine according to claim 1 in which the means for oscillating the levers comprise a cam for each lever, and the means for oscillating the plate comprises a third cam.

5. A machine according to claim 4 in which each of the cams for oscillating the levers is adjustable independently to vary the amplitude of the component of motion imparted by it to the plate.

6. A machine according to claim 4 in which there is a follower for each cam against which the cam acts in effecting motion of the related lever or plate, and means comprising a slide reciprocable on the frame for simultaneously effecting relative motion between all of the cams and their followers.

7. A machine according to claim 6 in which the cams are mounted on the slide, the followers for the lever-oscillating cams are carried by the levers, and the follower for the third cam is carried by the plate.

8. A machine according to claim 7 in which each of the cams is independently adjustable angularly on the slide about an axis perpendicular to said plane.

9. A machine according to claim 6 in which there is a reversible motor drive for reciprocating the slide, and means for adjusting the stroke of the slide to either side of a mean position.

10. A machine according to claim 9 in which there are means operable to displace one of the lever oscillating cams angularly from one to the other of two positions each time the slide passes said mean position.

11. A machine according to claim 9 in which there is a reversible spindle drive, and there are means operable to displace one of the lever oscillating cams angularly from one to the other of two positions each time the slide passes said mean position during forward drive of the spindle and to displace the cam angularly from one to the other of two other positions each time the slide passes said mean position during reverse drive of the spindle.

12. A machine according to claim 6 in which there is a reversible spindle drive, and there are means to displace one of the lever oscillating cams from one to the other of two positions upon reversal of the drive.

13. A machine according to claim 12 in which said displacement is a translation of the cam.

14. A machine according to claim 12 in which said displacement is an angular motion of the cam.

15. A machine according to claim 10 in which each of said positions of the cam is independently adjustable.

16. A machine according to claim 15 in which there are two positioning pistons operable in the support for one of said cams, each of said pistons being adapted when advanced to limit by abutment the motion of the cam in one of the two opposite directions and when retracted to allow motion beyond such limit, cam actuating means operable to move the cam in either direction, and a stop for each positioning piston for limiting the advance thereof, each stop being adjustable in the support independently of the other.

17. A machine having a support and a cam movable therein, two positioning pistons operable in the support and respectively adapted when advanced to limit by abutment such motion of the cam in one of the two opposite directions and when retracted to allow angular motion beyond such limit, cam actuating means operable to move the cam in either direction, and a stop for each positioning piston for limiting the advance thereof, each stop being adjustable in the support independently of the other.

18. A machine according to claim 17 in which the cam actuating means comprise two pistons adapted respectively to move the cam in the two opposite directions.

19. A machine according to claim 17 in which there are two sets of said positioning pistons and said stops therefor arranged to provide two different limits of motion of the cam in each direction.

20. A machine according to claim 17 in which the cam is angularly movable in an eccentric sleeve that is angularly movable in said support, said cam actuating means and said positioning pistons are arranged to effect and limit angular motion of the sleeve to thereby effect and limit translation of the cam, and there are other cam actuating means for effecting angular motion of the cam in the sleeve between opposed limit positions.

21. A machine according to claim 20 in which said other cam actuating means comprise two pistons for moving the cam angularly in opposite directions, and an independently adjustable stop for each piston for limiting the stroke of the piston in one direction.

22. A machine for runnnig a pair of gears together comprising a frame supporting a housing which journals a spindle for one gear, a plate supporting a housing which journals a spindle for the other gear, said plate being supported for movement relative to the frame in a plane parallel to both spindles, a pair of levers pivoted about axes perpendicular to said plane and providing a connection between the frame and the plate for guiding the latter for angular and translational motions relative to the frame in said plane, and means for effecting said motions.

References Cited in the file of this patent
UNITED STATES PATENTS 2,947,120    Bauer et al. _____ Aug. 2, 1960